(12) United States Patent
Saisho et al.

(10) Patent No.: US 8,673,504 B2
(45) Date of Patent: Mar. 18, 2014

(54) NON-AQUEOUS ELECTROLYTE SECONDARY BATTERY AND NON-AQUEOUS ELECTROLYTE

(75) Inventors: Keiji Saisho, Moriguchi (JP); Hidekazu Yamamoto, Moriguchi (JP); Masahiro Takehara, Inashiki-gun (JP)

(73) Assignees: SANYO Electric Co., Ltd., Moriguchi-shi (JP); Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 13/463,001

(22) Filed: May 3, 2012

(65) Prior Publication Data

US 2012/0219868 A1 Aug. 30, 2012

Related U.S. Application Data

(63) Continuation of application No. 11/917,374, filed as application No. PCT/JP2006/312644 on Jun. 23, 2006, now Pat. No. 8,206,853.

(30) Foreign Application Priority Data

Jun. 23, 2005 (JP) ................... 2005-183842

(51) Int. Cl.
*H01M 6/18* (2006.01)
(52) U.S. Cl.
USPC ........ 429/307; 429/218.1; 429/330; 429/332; 429/338; 429/339; 429/340; 429/341; 429/342; 429/199; 429/200; 429/233; 252/62.2
(58) Field of Classification Search
USPC .............. 429/307, 218.1, 330, 332, 338, 339, 429/340, 341, 342, 199, 200, 233; 252/62.2
See application file for complete search history.

(56) References Cited

U.S. PATENT DOCUMENTS

| | | | |
|---|---|---|---|
| 5,352,548 A | 10/1994 | Fujimoto et al. | |
| 6,221,534 B1 | 4/2001 | Takeuchi et al. | |
| 7,435,507 B2 | 10/2008 | Ohata et al. | |
| 7,803,487 B2 | 9/2010 | Shima | |
| 2005/0106464 A1 | 5/2005 | Yoshida et al. | |

FOREIGN PATENT DOCUMENTS

| | | |
|---|---|---|
| JP | 8-45545 | 2/1996 |
| JP | 3059832 | 4/2000 |
| JP | 2000-164251 | 6/2000 |
| JP | 2001-176548 | 6/2001 |
| JP | 2002-8719 | 1/2002 |
| JP | 2002-83594 | 3/2002 |
| JP | 2002-279972 | 9/2002 |
| JP | 2004-296270 | 10/2004 |
| JP | 2005-11725 | 1/2005 |
| JP | 2005-150038 | 6/2005 |
| JP | 2005-259641 | 9/2005 |
| JP | 2006-164759 | 6/2006 |

OTHER PUBLICATIONS

Huggins, R.A., "Lithium alloy negative electrodes formed from convertible oxides", Elsevier, Solid State Ionics, vol. 113-115, pp. 57-67 (1998).

*Primary Examiner* — Laura Weiner
(74) *Attorney, Agent, or Firm* — Oblon, Spivak, McClelland, Maier & Neustadt, L.L.P.

(57) ABSTRACT

The objective of the present invention is to prevent deterioration and expanding of anode active material and to improve charge-discharge cycle characteristics in a non-aqueous electrolyte secondary battery comprising an anode of which current collector has thereon a thin layer of an anode active material containing a metal. To solve this problem, in a non-aqueous electrolyte secondary battery wherein a thin layer of anode active material containing a metal which absorbs and discharges lithium is formed on a current collector and the thin layer of the anode active material is divided into columns by a gap formed along the thickness thereof, a compound represented by the following formula is contained in the non-aqueous electrolyte.

A—N=C=O

In the above formula, A represents an element or a group other than hydrogen.

9 Claims, 1 Drawing Sheet

NON-AQUEOUS ELECTROLYTE SECONDARY BATTERY AND NON-AQUEOUS ELECTROLYTE

This is a continuation application of U.S. application Ser. No. 11/917,374, filed Dec. 13, 2007, which is a 371 of PCT/JP06/312644 filed on Jun. 23, 2006.

TECHNICAL FIELD

The present invention relates to a non-aqueous electrolyte secondary battery and a non-aqueous electrolyte to be used for the same.

BACKGROUND ART

In recent years, as new type of secondary battery with high output and high energy density, a non-aqueous electrolyte secondary battery with light weight and high electromotive force has come to be used, which is based on a non-aqueous electrolyte containing lithium salt dissolved in a non-aqueous solvent and which effects charge and discharge, making use of oxidation and reduction of lithium.

In such a non-aqueous electrolyte secondary battery, lithium transition metal composite oxides such as lithium cobalt composite oxide, lithium nickel composite oxide and lithium manganese composite oxide have been widely used as cathode active material of the cathode. As anode active material of the anode, carbonaceous materials such as cokes, artificial graphite and natural graphite have been widely used either singly or as a mixture. As non-aqueous electrolyte, a non-aqueous solvent such as propylene carbonate or dimethyl carbonate, in which a lithium salt such as $LiPF_6$ or $LiBF_4$ is dissolved, has been used, for example.

However, in the non-aqueous electrolyte secondary battery mentioned above, the non-aqueous solvent in the non-aqueous electrolyte tends to be decomposed as a result of reaction on the surface of the anode based on carbonaceous material, thus leading to deterioration of storage characteristics and cycle characteristics of the battery.

In this connection, it has previously been known that, by using ethylene carbonate as non-aqueous solvent in a non-aqueous electrolyte, the above-mentioned decomposition tends to be suppressed and a portion of the decomposition products produced form a desirable protective layer on the surface of the anode. Because of this, ethylene carbonate has been mainly used as non-aqueous solvent.
However, even when ethylene carbonate is mainly used as non-aqueous solvent, the non-aqueous solvent is gradually decomposede as a result of reaction on repeated charges and discharges, and deterioration of storage performance and cycling performance remained to be a problem.

Therefore, recently, a proposal has been made, by adding a small amount of protective layer-forming agent such as vinylene carbonate to a non-aqueous electrolyte, to form an effective protective layer on the surface of the anode based on carbonaceous material during initial charge and discharge, thus bringing about improvement in storage performance and cycle performance of the non-aqueous electrolyte secondary battery (refer to Patent Documents 1 to 3, for example).

On the other hand, in recent years, in order to enhance charge-discharge capacity per unit mass or unit volume of a non-aqueous electrolyte secondary battery, a proposal has been made to use, as anode active material in the anode, a metal such as tin or silicon or its oxide capable of intercalating and deintercalating lithium ions instead of carbonaceous material mentioned above (refer to Non-patent Document 1, for example).

As anode using this type of anode active material, a proposal has been made for the anode wherein a thin layer of anode active material such as silicon or tin is formed on the current collector by such methods as CVD, sputtering, vapor deposition, thermal spraying or plating. It has been shown that high charge-discharge capacity and excellent charge-discharge cycle performance can be obtained by using this kind of anode. Namely, in this kind of anode, the thin layer of the anode active material is divided into columns by gaps formed in the thickness direction of the layer and the bottom of these columns is in tight contact with the current collector. Through the gap formed around the columns, the stress, which is caused by expanding/shrinkage of the thin layer of the anode active material accompanying charge-discharge cycle, is released, and generation of the type of stress which works to disconnect the thin layer of the anode active material from the current collector is prevented, leading to excellent charge-discharge cycle performance (refer to Patent Document 4 and 5, for example).

[Patent Document 1] Japanese Patent Application Laid-Open Publication (Kokai) No. H6-52887

[Patent Document 2] Japanese Patent Application Laid-Open Publication (Kokai) No. H8-45545

[Patent Document 3] Japanese Patent Publication No. 3059832

[Patent Document 4] Japanese Patent Application Laid-Open Publication (Kokai) No. 2002-83594

[Patent Document 5] Japanese Patent Application Laid-Open Publication (Kokai) No. 2002-279972

[Non-Patent Document 1] SolidStatelonics. 113-115-57 (1998)

DISCLOSURE OF THE INVENTION

Problem to be Solved by the Invention

However, when a metal such as tin or silicon, or an alloy or oxide containing these metals, is used as anode active material, its reactivity towards lithium salts or non-aqueous solvent in the non-aqueous electrolyte is very high in comparison with when anode active material based on carbonaceous material is used, leading to a problem that the anode active material is liable to deteriorate and expand. And there was also a problem that, because of this, charge-discharge cycle performance of the non-aqueous electrolyte secondary battery tends to deteriorate.

The present invention has been made in view of such problems. The purpose of the invention is to prevent, in a non-aqueous electrolyte secondary battery comprising an anode of which current collector has thereon a thin layer of an anode active material containing a metal, a reaction between anode active material and non-aqueous electrolyte and thus prevent deterioration and expanding of the anode active material, leading to improvement of charge-discharge cycle characteristics of the non-aqueous electrolyte secondary battery.

Means for Solving the Problem

The inventors of the present invention have made an intensive investigation to solve the above problem. They found that, in a non-aqueous electrolyte secondary battery comprising an anode of which current collector has thereon a thin layer of an anode active material containing a metal which absorbs and discharges lithium, and the thin layer of the anode active material being divided by a gap formed along the thickness thereof and shaped into columns, it is possible to prevent a reaction between anode active material and non-aqueous electrolyte, and thus to prevent deterioration and expanding of the anode active material by containing in the non-aqueous electrolyte a compound represented by the formula (I) below. This has also made possible the improvement in charge-discharge cycle performances of the non-aqueous electrolyte secondary battery, leading to the completion of the invention.

Namely, the subject matter of the present invention consists in a non-aqueous electrolyte secondary battery comprising an anode of which current collector has thereon a thin layer of an anode active material containing a metal which absorbs and discharges lithium, a cathode comprising a cathode active material which absorbs and discharges lithium, and a non-aqueous electrolyte where a lithium salt is dissolved in a non-aqueous solvent, the thin layer of the anode active material being divided by a gap formed along the thickness thereof and shaped into columns, wherein said non-aqueous electrolyte contains a compound represented by the formula (I) below.

[Chemical Formula 1]

(In the above formula (I), A represents an element or a group other than hydrogen.)

In the said secondary battery, it is preferable that the thin layer of an anode active material contains at least one material selected from the group consisting of silicon, silicon alloys, tin and tin alloys.

It is also preferable that the compound represented by the formula (I) is a compound selected from the compounds represented by the formula (II) below.

[Chemical Formula 2]

(In the above formula (II), $X^1$ and $X^2$ represent, independently of each other, an element other than hydrogen, Z represents an arbitrary element or group, m and n represent, independently of each other, an integer greater than or equal to 1, and when m is 2 or greater, each of Z may be the same or different from each other.)

It is also preferable that the compound represented by the formula (I) is a compound selected from the compounds represented by the formula (III) below.

[Chemical Formula 3]

(In the above formula (III), R represents, independently of each other, an alkyl group or aryl group that may have a substituent. In addition, more than one R may be connected to each other to form a ring.)

It is also preferable that said non-aqueous electrolyte contains 0.01 weight % or more and 20 weight % or less of the compound represented by the formula (I).

Furthermore, it is preferable that said non-aqueous electrolyte contains 0.1 weight % or more and 10 weight % or less of bis(trimethylsilyl)sulfate.

Furthermore, it is preferable that said non-aqueous electrolyte contains at least one type of solvent selected from the group consisting of cyclic carbonates, linear carbonates, lactone compounds, chained carboxylic acid esters, cyclic ethers and chain ethers, having 3 to 9 carbon atoms in total respectively, and the total amount of the above-mentioned solvent selected from the group consisting of cyclic carbonates, linear carbonates, lactone compounds, chained carboxylic acid esters, cyclic ethers and chain ethers, which are included in said non-aqueous electrolyte, and the compound represented by the formula (I) is 70 weight % or more in said non-aqueous electrolyte exclusive of the lithium salt.

It is also preferable that the total amount of the cyclic carbonate and the lactone compound is 5 weight % or more in said non-aqueous electrolyte exclusive of the lithium salt.

Furthermore, it is preferable that the lactone compound is at least one type selected from the group consisting of γ-butyrolactone, γ-valerolactone and δ-valerolactone, the cyclic carbonate is at least one type selected from the group consisting of ethylene carbonate, propylene carbonate and butylene carbonate, and the linear carbonate is at least one type selected from the group consisting of dimethyl carbonate, diethyl carbonate and ethyl methyl carbonate.

Furthermore, in the non-aqueous electrolyte secondary battery of the present invention, it is also preferable that the lithium salt contains 5 mol % or more in the total amount of the lithium salt of at least one type selected from the group consisting of $LiBF_4$ and $LiPF_6$.

Another subject matter of the present invention consists in a non-aqueous electrolyte to be used for a non-aqueous electrolyte secondary battery comprising an anode of which current collector has thereon a thin layer of an anode active material containing a metal which absorbs and discharges lithium, a cathode comprising a cathode active material which absorbs and discharges lithium, and a non-aqueous electrolyte where a lithium salt is dissolved in a non-aqueous solvent, the thin layer of the anode active material being divided by a gap formed along the thickness thereof and shaped into columns, wherein said non-aqueous electrolyte contains a compound represented by the above formula (I).

Advantageous Effect of the Invention

According to the non-aqueous electrolyte secondary battery and non-aqueous electrolyte of the present invention, in a non-aqueous electrolyte secondary battery comprising an anode of which current collector has thereon a thin layer of an anode active material containing a metal, it is possible to prevent a reaction between the anode active material and the non-aqueous solvent and thus prevent deterioration and expanding of anode active material, as well as to improve charge-discharge cycle characteristics of the non-aqueous electrolyte secondary battery.

EXPLANATION OF LETTERS OR NUMERALS 1 cathode
1a cathode current collector
2 anode
2a anode active material
2b anode current collector
2c gap formed in the thickness direction
3 separator
4 battery case
4a cathode case
4b anode case
5 insulation packing

BEST MODES FOR CARRYING OUT THE INVENTION

An embodiment of the present invention will be explained in detail below. The explanation given below on constituent features indicates one example of each aspect of the present invention (representative example) and by no means restrictive. Any modifications can be added thereto insofar as they do not depart from the scope of the invention.

The non-aqueous electrolyte secondary battery of the present invention comprises an anode of which current collector has thereon a thin layer of an anode active material containing a metal which absorbs and discharges lithium, a cathode consisting of a cathode active material which absorbs and discharges lithium, and a non-aqueous electrolyte where a lithium salt is dissolved in a non-aqueous solvent. Furthermore, the thin layer of the anode active material mentioned above is divided into columns by at least one gap formed along the thickness of the layer.

Further, the non-aqueous electrolyte secondary battery of the present invention uses a non-aqueous electrolyte solution of the present invention containing a compound represented by the formula (I) below.
[Chemical Formula 4]

$$A\text{-}N\!\!=\!\!C\!\!=\!\!O \tag{I}$$

(In the above formula (I), A represents an element or a group other than hydrogen.)

[1. Anode]

The anode used in the non-aqueous electrolyte secondary battery of the present invention comprises a current collector having thereon a thin layer of an anode active material containing a metal which absorbs and discharges lithium. Furthermore, the thin layer of the anode active material mentioned above is divided into columns by at least one gap formed along the thickness of the layer.

[1-1. Current Collector]

There is no special limitation on the material of the current collector, insofar as it can be brought into tight contact with the thin layer of the anode active material and does not form an alloy with lithium. As material of the current collector can be used, for example, copper, nickel, stainless steel, molybdenum, tungsten and tantalum. Of these, copper and nickel are preferable from the standpoint of easy availability. More preferable is copper.

The material of the current collector can be used either singly or as a combination of two or more kinds in any combination and in any ratio.

There is no special limitation on the dimension of the current collector, insofar as the advantage of the present invention is not significantly impaired. If the current collector is too thick, the volume of the current collector in the non-aqueous electrolyte secondary battery becomes large, which may lead to a decrease in capacity. It is preferable that the thickness is usually 30 µm or less, preferably 20 µm or less. On the other hand, if the current collector is too thin, its strength as electrode may be insufficient. It is preferable that the thickness is usually 1 µm or more, preferably 5 µm or more.

Furthermore, as will be mentioned later, it is preferable to use a current collector which has a concavoconvex surface, in order to facilitate formation of an appropriate gap in the thin layer of the anode active material. No particular limitation is imposed on the current collector having a concavoconvex surface. For example, a foil with a roughened surface can be used. As concrete example of this type of foil can be cited an electrolytic foil which is produced by immersing a metallic drum in an liquid electrolyte containing dissolved ions and rotating it while electric current is passed, causing deposition of the metal on the surface of the drum, followed by exfoliation of the deposited metal. Further, the surface of this electrolytic foil can be roughened before it is used as current collector. In addition to this type of electrolytic foil, a rolled foil, for example, on whose surface a metal is deposited by electrolysis, followed by surface-roughening process, can be used as current collector with a concavoconvex surface.

When the surface of the current collector is roughened as described above, it is preferable that the surface roughness Ra of the current collector is usually 0.01 µm or more, preferably 0.1 µm or more, and usually 1 µm or less, preferably 0.5 µm or less. The surface roughness Ra is provided in the Japan Industrial Standard (JISB0601-1994) and it can be measured using a surface roughness meter.

[1-2. Thin Layer of Anode Active Material]

In the non-aqueous electrolyte secondary battery of the present invention, a material containing a metal capable of intercalating and deintercalating lithium is used as anode active material. Preferable is a metal highly capable of intercalating and deintercalating lithium and having high volume theoretical capacity.

As preferable examples of anode active material can be cited metals such as silicon, germanium, tin, lead, zinc, magnesium, sodium, aluminum, potassium and indium or alloys containing these metals. Of these, preferable are silicon, germanium, tin, aluminum and alloys containing these metals. More preferable are silicon, tin and alloys containing them.

Anode active material can be used either singly or as a combination of two or more kinds in any combination and in any ratio.

In the non-aqueous electrolyte secondary battery of the present invention, an anode is used wherein a thin layer of anode active material is formed on the current collector, as mentioned above. No particular limitation is imposed on the thickness of this thin layer of the anode active material, insofar as the advantage of the present invention is not significantly impaired. Usually, the thickness is 0.1 µm or more, preferably 0.2 µm or more, more preferably 0.5 µm or more, and usually 30 µm or less, preferably 25 µm or less, more preferably 20 µm or less. When the thickness is below the above lower limit, the proportion of active material in the anode as a whole is low and the advantage of using anode active material with high capacity may be impaired greatly. When the upper limit is exceeded, unused anode active material exists in the battery in a large amount, this leading to a decrease in energy density. Also, cathode potential increases under the usually used charging conditions to avoid a decrease in anode potential, causing gas evolution accompanying oxidative decomposition of the liquid electrolyte, as a result of which the battery characteristics may deteriorate markedly.

Furthermore, in the non-aqueous electrolyte secondary battery of this invention, the thin layer of the anode active material mentioned above is divided into columns by at least one gap formed along the thickness of the layer. In more detail, the thin layer is divided into columns by gaps (in other words by gaps), formed along the thickness of the layer and the bottom of the above-mentioned columns is in tight contact with the current collector. By this arrangement, a space is formed around the columns by the gaps, and the contact between the thin layer and the current collector, at the bottom of the columns, can be kept close. This space is instrumental in releasing stress caused by expanding/shrinkage of the thin layer accompanying charge-discharge cycle and in preventing the generation of the type of stress which works to disconnect the thin layer of the active material from the current collector.

No particular limitation is imposed on the size of the above gaps insofar as the advantage of the present invention is not significantly impaired. It is preferable that at least ½ or more of the thickness of the thin layer is divided into columns by the gap in order to secure the above-mentioned effect of releasing stress.

Furthermore, it is preferable that the top of the columns of the above thin layer is round-shaped in order to avoid concentration of electric current on charge and discharge reaction.

Furthermore, in order for the thin layer of the anode active material, divided into columns by gaps as described above, to be in tight contact with the current collector and maintained stably as the state of columns, it is preferable that the component of the current collector diffuses into the thin layer of the anode active material in a manner that its concentration in the thin layer is distributed continuously. The active material layer into which the component of the current collector diffuses has its charge-discharge capacity greatly reduced and, therefore, it is preferable that the thickness of the active material layer into which the component of the current collector diffuses is kept at a minimum level necessary to maintain tight contact.

There is no special limitation on the method of preparing the above-mentioned thin layer of the anode active material. For example, such methods as CVD, sputtering, vapor deposition, thermal spraying and plating can be applied to form a thin layer by accumulating the above anode active material on the current collector.

Further, no particular limitation is imposed on the method of forming the gaps along the thickness of the thin layer. For example, using a current collector with a concavoconvex surface, a thin layer of anode active material can be formed on its surface. The thickness of the thin layer of the anode active material is then varied corresponding to the concavoconvex nature of the current collector, gaps gaps can be then made to divide the thin layer of the anode active material into columns at positions where the layer is thin. Furthermore, gaps can be formed initially for dividing the thin layer into columns or it can be so arranged that gaps are formed by charge and discharge to divide the thin layer into columns.

[1-3. Others]

Depending on the type of a current collector or anode active material, it is sometimes preferable that the anode involves constitutions other than those mentioned above.

For example, when silicon is used as anode active material for the thin layer, it is preferable to arrange so that the component of the current collector diffused into the thin layer of anode active material does not form an intermetallic compound but form a solid solution with silicon. For that purpose, it is preferable that the thin layer of the anode active material composed of silicon, mentioned above, is an amorphous or microcrystalline thin layer.

When, for example, tin is used as anode active material for the thin layer, it is preferable that a mixed phase consisting of the component of the current collector and the tin component of the anode active material is formed between the current collector and the thin layer of anode active material. This mixed phase can be an intermetallic compound state or a solid solution state formed between the current collector component and the tin component of the anode active material.

There is no special limitation on the method of forming the above-mentioned mixed phase. For example, heat treatment of the anode can be employed. The condition of heat treatment varies depending on the type of the current collector. For example, when the current collector is made of steel, vacuum heat treatment is desirable at temperatures of usually 100° C. or higher, preferably 160° C. or higher, and usually 240° C. or lower, preferably 220° C. or lower.

When a thin layer of the anode active material is formed on the current collector as described above, it is possible to use a material in which lithium is intercalated in advance, as above-mentioned anode active material. Otherwise, it is possible to add lithium when the thin layer of anode active material is formed or to intercalate or add lithium to the thin layer of the anode active material after the thin layer of the anode active material has been formed.

[2. Cathode]

There is no special limitation on the cathode used in the non-aqueous electrolyte secondary battery of the present invention, insofar as the cathode active material which absorbs and discharges lithium is used.

Any known material, capable of intercalating and deintercalating lithium, can be used as cathode active material. For example, lithium transition metal composite oxides such as lithium cobalt composite oxide, lithium nickel composite oxide, lithium manganese composite oxide, lithium vanadium composite oxide, lithium iron composite oxide, lithium chromium composite oxide and lithium titanium composite oxide can be used.

Cathode active material can be used either singly or as a combination of two or more kinds in any combination and in any ratio.

A cathode can be produced by any known method. For example, slurry is prepared by adding, as appropriate, a binder, thickener, electroconductor and solvent to the above cathode active material, and this slurry is applied onto a current collector, followed by drying, to obtain a cathode. Or the above cathode active material can be roll-molded into a sheet-type cathode or compression-molded into a pellet-type cathode. It is also possible to accumulate the above cathode active material on a current collector in the shape of a thin layer by such methods as CVD, sputtering, vapor deposition and thermal spraying.

When a binder is used in the production of a cathode as described above, there is no special limitation on its material insofar as it is stable against solvents used in the production of the cathode, a non-aqueous electrolyte of the non-aqueous electrolyte secondary battery and other materials used at the time of battery use. As examples of binder can be cited polyfluorovinylidene, polytetrafluoroethylene, styrene butadiene rubber, isoprene rubber and butadiene rubber. A binder can be used either singly or as a combination of two or more kinds in any combination and in any ratio.

When a thickener is used in the production of a cathode, there is no special limitation on its material insofar as it is stable against solvents used in the production of the cathode, a non-aqueous electrolyte of the non-aqueous electrolyte secondary battery and other materials used at the time of battery use. As examples of thickener can be cited carboxymethyl cellulose, methyl cellulose, hydroxymethyl cellulose, ethyl cellulose, polyvinyl alcohol, oxidized starch, phosphorylated starch and casein. A thickener can be also used either singly or as a combination of two or more kinds in any combination and in any ratio.

When an electroconductor is used in the production of a cathode, there is no special limitation on its material insofar as it is stable against solvents used in the production of the cathode, a non-aqueous electrolyte of the non-aqueous electrolyte secondary battery and other materials used at the time of battery use. As examples of the electroconductor can be cited metal materials such as copper and nickel and carbon materials such as graphite and carbon black. A electroconductor can be also used either singly or as a combination of two or more kinds in any combination and in any ratio.

When a current collector is used in the production of a cathode, there is no special limitation on its material insofar as the advantage of the present invention is not significantly impaired. As examples of the current collector of the cathode can be cited metals such as aluminum, titanium and tantalum. In particular, aluminum foil is preferable because it is easy to process into a thin layer and, besides, inexpensive. Materials of the current collector can be also used either singly or as a combination of two or more kinds in any combination and in any ratio.

[3. Non-Aqueous Electrolyte]

In the non-aqueous electrolyte secondary battery of the present invention, the non-aqueous electrolyte of the present invention, in which a lithium salt is dissolved in a non-aqueous solvent and a compound represented by the above formula (1) (hereinafter referred to as "specific compound" as appropriate) is contained, is used as non-aqueous electrolyte.

[3-1. Specific Compound]

The specific compound of the present invention is a compound represented by the above formula (I).

In the formula (I), A represents an arbitrary element or a group other than hydrogen. However, from the standpoint of electrochemical stability of the specific compound represented by the formula (I), it is preferable that A is other than an aryl group or other than a group having an aryl group as substituent. In other words, it is preferable that A is an element or a group other than an aryl group and it is preferable that A is an element or a group other than a group having an aryl group as substituent.

Furthermore, from the standpoint of stability of the specific compound as organic compound and stability of a protective layer formed, A is preferably halogen among various elements, and a chained or cyclic, saturated or unsaturated hydrocarbon group that may have a substituent among various groups.

Furthermore, among the specific compounds, preferable are those represented by the formula (II) or (III) below. Namely, in the formula (I), it is preferable that A is connected with nitrogen atom via a bond other than nitrogen to carbon double bond, in the formula (II) or (III).

[Chemical Formula 5]

(II)

(In the above formula (II), $X^1$ and $X^2$ represent, independently of each other, an element other than hydrogen, Z represents an arbitrary element or group, m and n represent, independently of each other, an integer greater than or equal to 1, and when m is 2 or greater, each of Z may be the same or different from each other.)

[Chemical Formula 6]

(III)

(In the above formula (III), R represents, independently of each other, an alkyl group or aryl group that may have a substituent. In addition, more than one R may be connected to each other to form a ring.)

The formula (II) and (III) will be explained in more detail below.

In the formula (II), $X^1$ and $X^2$ represent, independently of each other, an element other than hydrogen. $X^1$ and $X^2$ can be an arbitrary element other than hydrogen insofar as the chemical structure of the above formula (II) can be satisfied. As preferable concrete example of $X^1$ can be cited carbon, sulfur and phosphorus. As preferable concrete example of $X^2$ can be cited oxygen and nitrogen.

Further, in the formula (II), Z represents an arbitrary element or a group. As preferable concrete example of Z can be cited an alkyl group. Of alkyl group, preferable are methyl group, ethyl group, fluoromethyl group, trifluoromethyl group, 2-fluoroethyl group and 2,2,2-trifluoroethyl group. Particularly preferable are methyl group and ethyl group. When m is 2 or greater, each of Z may be the same or different from each other. Further, two or more Z may be connected to each other, as appropriate, to form a ring.

In the formula (II), m and n each represent an integer greater than or equal to 1.

Among the specific compounds represented by the formula (II), the following compounds can be cited as preferable concrete examples. In the following examples, $R^1$ represents, independently of each other, an alkyl group. As concrete example of $R^1$ can be cited a group indicated as preferable alkyl group for Z in the formula (II).

[Chemical Formula 7]

On the other hand, in the formula (III), R represents, independently of each other, an alkyl group or an aryl group that may have a substituent.

As concrete example of R as alkyl group can be cited methyl group, ethyl group, fluoromethyl group, trifluoromethyl group, 2-fluoroethyl group and 2,2,2-trifluoroethyl group. Particularly preferable are methyl group and ethyl group.

When R is an aryl group, concrete examples include phenyl group, o-tolyl group, m-tolyl group, p-tolyl group, o-fluorophenyl group, m-fluorophenyl group and p-fluorophenyl group.

Each of R may be the same group or a different group. Further, two or more R may be connected to each other to form a ring.

Of the specific compounds represented by the formula (III), the following compounds can be cited as preferable concrete examples.

[Chemical Formula 8]

Of the specific compounds, the following compounds can be cited as preferable concrete examples.

The specific compound can be used in the non-aqueous electrolyte of the present invention either singly or as a mixture of more than one kind in any combination and in any ratio.

There is no special limitation on the molecular weight of the specific compound insofar as the advantage of the present invention is not significantly impaired. Usually, it is 100 or more. There is no upper limit. Usually, it is 300 or lower, preferably 200 or lower for the practical purpose.

When the specific compound is contained in the non-aqueous electrolyte of the present invention, there is no special limitation on its content insofar as the advantage of the present invention is not significantly impaired. When the content of the specific compound is too low, the advantage of the specific compound can not be fully exhibited. Therefore, the content of the specific compound in the non-aqueous electrolyte, exclusive of the lithium salt, is usually 0.01 weight % or higher, preferably 0.1 weight % or higher, more preferably 0.5 weight or higher. On the other hand, when the content of the specific compound is too high, the capacity of the battery may decrease because of excessive reaction of the specific compound. Therefore, it is usually 20 weight % or lower, preferably 10 weight % or lower, more preferably 5 weight % or lower.

There is no special limitation on the method of production of the specific compound. Any known methods can be used.

[3-2. Non-Aqueous Solvent]

Any non-aqueous solvent which the non-aqueous electrolyte of the present invention can contain can be used insofar as the advantage of the present invention is not significantly impaired. A non-aqueous solvent can be used either singly or as a mixture of two or more kinds in any combination and in any ratio.

As preferable non-aqueous solvent which can be used for the non-aqueous electrolyte of the present invention can be cited cyclic carbonates, linear carbonates, lactone compounds (cyclic carboxylic acid esters), chain carboxylic acid esters, cyclic ethers and chain ethers. Of these compounds, particularly preferable are those compounds having 3 to 9 carbon atoms in total respectively.

As cyclic carbonate having 3 to 9 carbon atoms in total can be cited, for example, ethylene carbonate, propylene carbonate, butylene carbonate, vinylene carbonate and vinylethylene carbonate. Of these, ethylene carbonate, propylene carbonate and butylene carbonate can be used preferably.

As linear carbonate having 3 to 9 carbon atoms in total can be cited, for example, dimethyl carbonate, diethyl carbonate, di-n-propyl carbonate, di-i-propyl carbonate, n-propylisopropyl carbonate, di-n-butyl carbonate, di-i-butyl carbonate, di-t-butyl carbonate, n-butyl-i-butyl carbonate, n-butyl-t-butyl carbonate, i-butyl-t-butyl carbonate, ethylmethyl carbonate, methyl-n-propyl carbonate, n-butylmethyl carbonate, i-butylmethyl carbonate, t-butylmethyl carbonate, ethyl-n-propyl carbonate, n-butylethyl carbonate, i-butylethyl carbonate, t-butylethyl carbonate, n-butyl-n-propyl carbonate, i-butyl-n-propyl carbonate, t-butyl-n-propyl carbonate, n-butyl-i-propyl carbonate, i-butyl-i-propyl carbonate and t-butyl-i-propyl carbonate. Of these, dimethyl carbonate, diethyl carbonate and ethylmethyl carbonate can be used preferably.

As lactone compound having 3 to 9 carbon atoms in total can be cited, for example, γ-butyrolactone, γ-valerolactone and δ-valerolactone. Of these, γ-butyrolactone can be used preferably.

As chained carboxylic acid ester having 3 to 9 carbon atoms in total can be cited, for example, methyl acetate, ethyl acetate, n-propyl acetate, i-propyl acetate, n-butyl acetate, i-butyl acetate, t-butyl acetate, methyl propionate, ethyl propionate, n-propyl propionate, i-propyl propionate, n-butyl propionate, i-butyl propionate and t-butyl propionate. Of these, ethyl acetate, methyl propionate and ethyl propionate can be used preferably.

As cyclic ether having 3 to 9 carbon atoms in total can be cited, for example, tetrahydrofuran, 2-methyltetrahydrofuran, 1,3-dioxolane, 1,3-dioxane and 1,4-dioxane.

As chain ether having 3 to 9 carbon atoms in total can be cited, for example, dimethoxymethane, dimethoxyethane, diethoxymethane, diethoxyethane, ethoxymethoxymethane and ethoxymethoxyethane. Of these, dimethoxyethane and diethoxyethane can be used preferably.

It is preferable that the total amount of the above specific compound and the above-mentioned solvent selected from the group consisting of cyclic carbonates, linear carbonates, lactone compounds (cyclic carboxylic acid esters), chained carboxylic acid esters, cyclic ethers and chain ethers, each having a total carbon number of 3 to 9, in the non-aqueous electrolyte exclusive of the lithium salt, should be adjusted to usually 70 weight % or more, preferably 80 weight % or more, more preferably 90 weight % or more. This is because the lithium ion conductivity and stability of the non-aqueous electrolyte is then enhanced, leading to improvement in battery characteristics of the non-aqueous electrolyte secondary battery. When two or more kinds of cyclic carbonates, linear carbonates, lactone compounds (cyclic carboxylic acid esters), chained carboxylic acid ester, cyclic ethers and chain ethers are used as solvent, the total weight of those solvents and specific compound should be adjusted to fall within the above range.

Furthermore, it is preferable that, in the non-aqueous electrolyte, the total amount of the cyclic carbonate and lactone compound, each having a total carbon number of 3 to 9, to the weight of the non-aqueous electrolyte exclusive of the lithium salt, should be adjusted to 5 weight % or more, preferably 10 weight % or more, more preferably 20 weight % or more. The specific compounds and linear carbonates are a low-permittivity solvent and cyclic carbonates and lactone compounds are a high-permittivity solvent. The combination of these solvents in an appropriate ratio brings about improvement in lithium ion conductivity and stability, leading to better balance of battery characteristics of the non-aqueous electrolyte secondary battery of the present invention.

[3-3. Lithium Salt]

Lithium salt is used as electrolyte in the non-aqueous electrolyte of the present invention. There is no special limitation on this lithium salt and any type of it can be used, insofar as the advantage of the present invention is not significantly impaired. Inorganic or organic lithium salts, which are usually used in a non-aqueous electrolyte, are preferred.

As inorganic lithium salt can be cited inorganic fluorides such as $LiBF_4$, $LiPF_6$, $LiAsF_6$ and $LiAlF_4$, and perhalogenates such as $LiClO_4$, $LiBrO_4$ and $LiIO_4$.

As organic lithium salt can be cited the following fluorine-containing organic lithium salts: organic sulfonic acid salts such as $LiCF_3SO_3$; perfluoroalkylsulfonic acid imides such as $LiN(CF_3SO_2)_2$, $LiN(C_2F_5SO_2)_2$ and $LiN(CF_3SO_2)(C_4F_9SO_2)$; perfluoroalkylsulfonic acid methides such as $LiC(CF_3SO_2)_3$; inorganic fluorides in which a part of fluorine atoms is replaced by perfluoroalkyl group such as $LiPF_3(CF_3)_3$, $LiPF_2(C_2F_5)_4$, $LiPF_3(C_2F_5)_3$, $LiB(CF_3)_4$, $LiBF(CF_3)_3$, $LiBF_2(CF_3)_2$, $LiBF_3(CF_3)$, $LiB(C_2F_5)_4$, $LiBF(C_2F_5)_3$, $LiBF_2(C_2F_5)_2$ and $LiBF_3(C_2F_5)$.

Of these, preferable are $LiBF_4$, $LiPF_6$, $LiN(CF_3SO_2)_2$, $LiN(C_2F_5SO_2)_2$, $LiN(CF_3SO_2)(C_4F_9SO_2)$, $LiPF_3(CF_3)_3$, $LiPF_3(C_2F_5)_3$ and $LiBF_2(C_2F_5)_2$.

Lithium salt may be used either singly or as a mixture of two or more kinds in any combination and in any ratio.

In particular, the use of $LiBF_4$ and $LiPF_6$ as lithium salt assures excellent non-aqueous electrolyte with high electrochemical stability and high electric conductivity in the broad temperature range, which is more preferable. In order to fully exhibit the advantage of $LiBF_4$ and $LiPF_6$, the content of $LiBF_4$ and/or $LiPF_6$ in the total amount of lithium salt in the non-aqueous electrolyte is usually 5 mol % or more, preferably 30 mol % or more.

There is no special limitation on the concentration of lithium salt in the non-aqueous electrolyte, insofar as the advantage of the present invention is not significantly impaired. However, when the concentration of the lithium salt in the non-aqueous electrolyte is too low, electric conductivity may be decreased in the non-aqueous electrolyte. On the other hand, when the concentration of lithium salt is too high, the viscosity of the non-aqueous electrolyte may increase, bringing about a decrease in electric conductivity, and the lithium salt may precipitate out at low temperatures, leading to reduction in performance of the non-aqueous electrolyte secondary battery. Therefore, the concentration of the lithium salt in the non-aqueous electrolyte should be kept in the range of usually 0.1 mol/l or higher, preferably 0.3 mol/l or higher, more preferably 0.5 mol/l or higher, and usually 3 mol/l or lower, preferably 2.5 mol/l or lower, more preferably 2 mol/l or lower.

[3-4. Additive]

To the above non-aqueous electrolyte may be added known additives.

There is no special limitation on the additives insofar as the advantage of the present invention is not significantly impaired. As examples can be cited a protective-layer forming agent, overcharge-preventing agent, dehydrating agent and deacidifying agent.

As preferable protective-layer forming agent, which affects the anode directly, can be cited, for example, vinylene carbonate, fluoroethylene carbonate and bis(trimethylsilyl)sulfate. Of these, bis(trimethylsilyl)sulfate is particularly preferable.

Additives may be used either singly or as a mixture of more than one kind in any combination and in any ratio.

No particular limitation is imposed on the amount of additives used, insofar as the advantage of the present invention is not significantly impaired. When the amount of the additive is too large, its decomposition may negatively affect the battery characteristics and, therefore, it is preferable that the amount of the additive should be adjusted appropriately. More concretely, it is preferable that its content in the non-aqueous electrolyte of the present invention is usually 0.01 weight % or more, preferably 0.05 weight % or more, more preferably 0.1 weight % or more, and usually 20 weight % or less, preferably 10 weight % or less, more preferably 5 weight % or less. In particular, it is preferable to use bis(trimethylsilyl)sulfate in the above concentration range.

[4. Separator]

In the non-aqueous electrolyte secondary battery of the present invention, a separator may be used as appropriate. There is no special limitation on the shape or structure of the separator and any known separator can be used. It is preferable to use one which is constituted of material stable against the non-aqueous electrolyte and with excellent water-retaining characteristics. For example, it is preferable to use porous sheet or non-woven fabric made of polyolefin such as polyethylene and polypropylene.

[5. Shape or the Like of Non-Aqueous Electrolyte Secondary Battery]

There is no special limitation on the shape, dimension and structure of a non-aqueous electrolyte secondary battery of the present invention. Examples are as follows: cylindrical type non-aqueous electrolyte secondary battery based on an electrode body rolled up into a spiral form with a separator between a cathode and an anode, both shaped into a sheet; cylindrical type non-aqueous electrolyte secondary battery having an inside out structure with a separator between a cathode and an anode, both shaped into a pellet; coin type non-aqueous electrolyte secondary battery with a separator between a cathode and an anode, both shaped into a pellet.

[6. Advantageous Effect]

According to the non-aqueous electrolyte secondary battery of the present invention, use is made of an anode wherein a thin layer of anode active material, containing a metal which absorbs and discharges lithium, is formed on the current collector, and this thin layer of anode active material is divided into columns by at least one gap formed along the thickness of the layer, this arrangement being instrumental in enhancing charge-discharge capacity.

Furthermore, although the reason is not clear, by using a non-aqueous electrolyte of the present invention, containing a specific compound, an effective protective layer is formed on the surface of the anode active material which is divided into columns. Through this mechanism, the non-aqueous electrolyte secondary battery of the present invention can suppress deterioration and expanding of the anode active material caused by the reaction between the anode active material and the non-aqueous electrolyte, leading to marked improvement in charge-discharge cycle characteristics.

EXAMPLE

In the following, the non-aqueous electrolyte secondary battery and non-aqueous electrolyte of the present invention will be explained concretely by referring to examples, and improvement in cycle characteristics in the non-aqueous electrolyte secondary battery of these examples will be clarified in comparison with comparative examples. It is to be understood that the present invention is not limited to these examples and any modification can be added thereto so long as it does not depart from the scope of the present invention. In the explanations of the following examples and comparative examples, each mark in the parenthesis "[ ]" is a mark indicating a corresponding part in the corresponding drawing.

Examples 1 to 7

Figure 1:
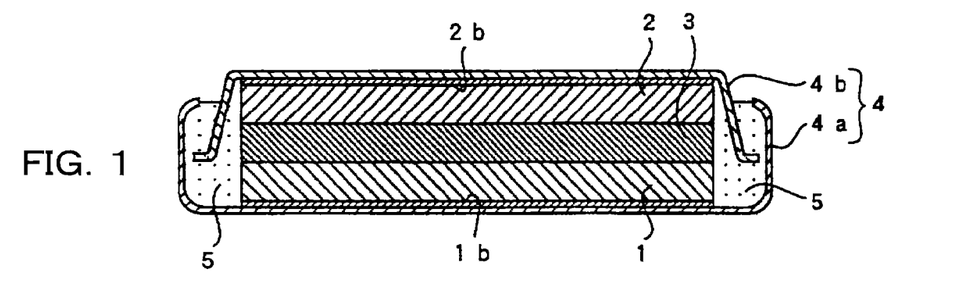
FIG. 1 is a schematic cross-sectional view illustrating a non-aqueous electrolyte secondary battery prepared in Examples 1 to 7 and Comparative Examples 1 to 3 of the present invention.

In Examples 1 to 7, an anode and a cathode, as well as a non-aqueous electrolyte, were prepared according to the method described below and a depressed, coin-type non-aqueous electrolyte secondary battery, as shown in FIG. 1, was prepared.

[Preparation of Anode]

In preparing the anode, RF sputtering (high-frequency sputtering) was conducted on the anode current collector consisting of an electrolytic copper foil (thickness of 18 μm; surface roughness Ra=0.188 μm) under the conditions of 100 sccm of sputtering gas (Ar) flow rate, room temperature of substrate (no heat applied), 0.133 Pa ($1.0 \times 10^{-3}$ Torr) of reaction pressure, 200 W of high frequency electric power, and a thin layer of anode active material composed of about 5 μm thickness of silicon thin layer was formed. Sccm shown above is the abbreviation of Standard cc $min^{-1}$ and indicates a flow rate per 1 min, expressed in cc, at 0° C. and 1 atmospheric pressure.

Raman spectrometric analysis was performed on the silicon thin layer obtained. A peak close to wavelength 480 $cm^{-1}$ was detected but not a peak close to 520 $cm^{-1}$. This indicated amorphous nature of the silicon thin layer.

Figure 2:
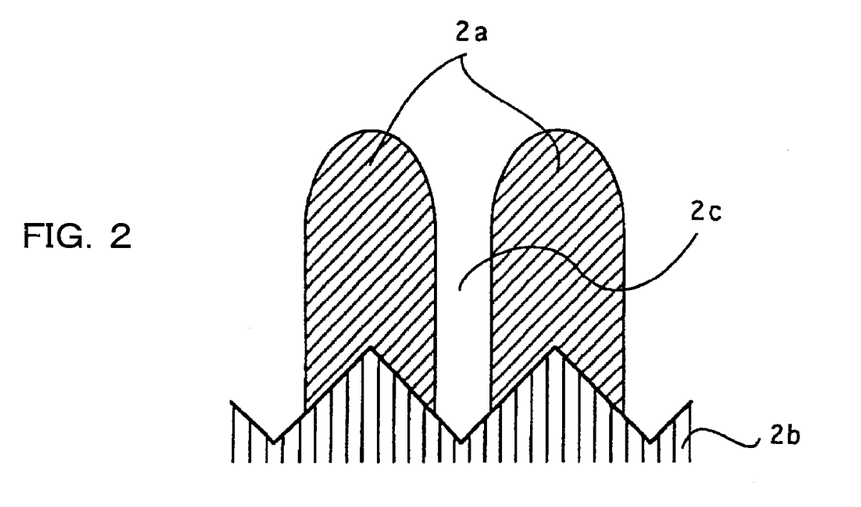
FIG. 2 is a schematic view illustrating a state of an anode used in Examples 1 to 7 and Comparative Examples 1 to 3 of the present invention.

The thin layer of anode active material composed of an amorphous silicon thin layer formed, as described above, on the anode current collector was observed by SEM (scanning electron microscope). As shown in the schematic view of FIG. 2, this thin layer of the anode active material [2a] had a structure divided into columns by gaps [2c] formed along the thickness of the thin layer, whose structure corresponded to a concavoconvex shape of the above anode current collector [2b].

This anode current collector consisting of an electrolytic copper foil on which was formed a thin layer of anode active material composed of an amorphous silicon thin layer was dried in vacuo at 100° C. for 2 hours and punched out into a disc of 10.0 mm in diameter to prepare an anode.

[Preparation of Cathode]

In preparation of the cathode, powder of lithium-containing cobalt dioxide $LiCoO_2$ (C5 of Nihon Kagaku Kogyo) was used as cathode active material. To 85 weight parts of $LiCoO_2$ powder, 6 weight parts of carbon black (Denka Black of Denki Kagaku Kogyo) and 9 weight parts of polyfluorovinylidene (KF-1000 of Kureha Kagaku) were added, and they were mixed. To this mixture was further added N-methyl-2-pyrrolidone and slurry was prepared. This slurry was applied evenly onto an aluminum foil of 20 μm thickness, which is the cathode current collector, in a manner that it corresponded to about 90% of the theoretical capacity of the above-mentioned anode. After drying at 100° C. for 12 hours, this was punched out into a disk of 10.0 mm diameter to prepare a cathode.

[Preparation of Non-Aqueous Electrolyte]

In preparing the non-aqueous electrolyte, non-aqueous solvents of ethylene carbonate and diethyl carbonate were mixed in a volume ratio of 3:7 and lithium hexafluorophosphate $LiPF_6$ was dissolved in this mixture as a solute to give a concentration of 1 mol/l. Further, the specific compound and, as appropriate, an additive were added to this non-aqueous electrolyte. The kind and amount of the specific compounds and other additives used in each Example and Comparative Example are shown in Table 1.

[Preparation of Battery]

In assembling a battery, a separator [3] made of a polypropylene microporous membrane was placed, as shown in FIG. 1, between the cathode [1] and the anode [2], which were prepared as above. This separator [3] was impregnated with the above non-aqueous electrolyte and these were placed in a battery case [4] consisting of a cathode case [4a] and anode case [4b], both made of stainless steel. The cathode [1] was connected with the cathode case [4a] via the above cathode current collector [1b] and the anode [2] was connected with the anode case [4b] via the above anode current collector [2b]. And an insulation packing [5] was placed between the cathode case [4a] and anode case [4b]. The battery case [4] was then tightly sealed, with cathode case [4a] being electrically insulated from anode case [4b], completing a non-aqueous electrolyte secondary battery with a designed capacity of 3.4 mAh.

Comparative Examples 1 to 3

In Comparative Examples 1 to 3, a non-aqueous electrolyte secondary battery was prepared under the conditions identical to those of Examples 1 to 7, except that a non-aqueous electrolyte used was changed.

Further, in Comparative Examples 1 to 3, a specific compound was not added and an additive other than specific compound was added, as appropriate, to the otherwise similarly prepared non-aqueous electrolyte to the non-aqueous electrolyte in Examples 1 to 7.

[Method of Evaluation]

Each non-aqueous electrolyte secondary battery of Examples 1 to 7 and Comparative Examples 1 to 3, prepared as described above, was then charged under the temperature condition of 25° C. with a charging current of 1.2 mA until the voltage reached 4.2 V and further charged under 4.2 V constant voltage until the charging current decreased 0.12 mA. It was then discharged with a discharging current of 1.2 mA until the discharge termination voltage reached 2.5 V. This charge-discharge cycle was repeated 100 times and the discharge capacity at the 100th cycle Q100 (mAh) was obtained. The result is shown in Table 1.

After discharging of 1st and 100th cycle, each non-aqueous electrolyte secondary battery of Examples 1 to 7 and Comparative Examples 1 to 3 was disassembled and the thickness of the anode at the 1st and the 100th cycle was measured by SEM (scanning electron microscope). The ratio of the anode thickness of the 100th cycle $t_{100}$ to that of the 1st cycle $t_1$ ($t_{100}/t_1$) was calculated. The result is also shown in Table 1.

TABLE 1

| | specific compound | | other additive | | discharge capacity at the 100th cycle $Q_{100}$ (mAh) | ratio of the negative-electrode thickness $t_{100}/t_1$ |
|---|---|---|---|---|---|---|
| | kind | amount (wt %) | kind | amount (wt %) | | |
| Example 1 |  | 2 | — | — | 1.58 | 1.3 |

TABLE 1-continued

| | specific compound | | other additive | | discharge capacity at the 100th cycle $Q_{100}$ (mAh) | ratio of the negative-electrode thickness $t_{100}/t_1$ |
|---|---|---|---|---|---|---|
| | kind | amount (wt %) | kind | amount (wt %) | | |
| Example 2 |  | 2 | — | — | 2.05 | 1.0 |
| Example 3 |  | 1 | — | — | 1.95 | 1.1 |
| Example 4 |  | 2 | — | — | 1.66 | 1.2 |
| Example 5 |  | 2 | vinylene carbonate | 2 | 1.79 | 2.0 |
| Example 6 |  | 2 | vinylene carbonate | 2 | 2.20 | 2.0 |
| Example 6 |  | 2 | fluoroethylene carbonate | 2 | 2.10 | 1.6 |
| Example 7 |  | 2 | bis(trimethylsilyl)sulfate | 2 | 2.30 | 1.1 |
| Comparative Example 1 | — | — | — | — | 0.59 | 5.0 |
| Comparative Example 2 | — | — | vinylene carbonate | 2 | 1.09 | 4..5 |
| Comparative Example 3 | — | — | bis(trimethylsilyl)sulfate | 2 | 0.96 | 4..5 |

As is shown in the Table 1, in the non-aqueous electrolyte secondary batteries of Examples 1 to 7, which contain a specific compound in the non-aqueous electrolyte, expanding of the anode is suppressed in comparison with the non-aqueous electrolyte secondary batteries of Comparative Examples 1 to 3, which do not contain a specific compound in the non-aqueous electrolyte. It has been confirmed that the discharge capacity at the 100th cycle Q100 is also high. These data demonstrate that, according to the non-aqueous electrolyte secondary battery and non-aqueous electrolyte of the present invention, it is possible to prevent deterioration and expanding of the anode active material caused by the reaction between anode active material and non-aqueous electrolyte, as well as to improve charge-discharge cycle characteristics of the non-aqueous electrolyte secondary battery.

Industrial Applicability

The present invention can be applied to a secondary battery based on a non-aqueous electrolyte. Particularly, it can be preferably applied to a lithium secondary battery.

The present invention has been explained in detail above by referring to specific embodiments. However, it is obvious for those skilled in the art that various modifications can be added thereto without departing from the intention and the scope of the present invention.

The present application is based on the description of Japanese Patent Application No. 2005-183842, which was filed on Jun. 23, 2005, and their entireties are incorporated herewith by reference.

The invention claimed is:

1. A non-aqueous electrolyte secondary battery comprising an anode of which current collector has thereon a thin layer of an anode active material comprising a metal which absorbs and discharges lithium, a cathode comprising a cathode active material which absorbs and discharges lithium, and a non-aqueous electrolyte where a lithium salt is dissolved in a non-aqueous solvent, the thin layer of the anode active material being divided by a gap formed along the thickness thereof and shaped into columns, wherein said non-aqueous electrolyte comprises a compound selected from the group consisting of wherein $R^1$ is an alkyl group or a fluoroalkyl group, and
wherein the thin layer of an anode active material comprises at least one material selected from the group consisting of silicon, silicon alloys, tin and tin alloys.

2. A non-aqueous electrolyte secondary battery as defined in claim 1, wherein the compound is selected from the group consisting of 3. A non-aqueous electrolyte secondary battery as defined in claim 1, wherein the compound is selected from the group consisting of 4. A non-aqueous electrolyte secondary battery as defined in claim 1, wherein said non-aqueous electrolyte contains 0.01 weight % or more and 20 weight % or less of the compound.

5. A non-aqueous electrolyte secondary battery as defined in claim 1, wherein said non-aqueous electrolyte contains 0.1 weight % or more and 10 weight % or less of bis(trimethylsilyl)sulfate.

6. A non-aqueous electrolyte secondary battery as defined in claim 1, wherein said non-aqueous electrolyte comprises at least one solvent selected from the group consisting of cyclic carbonates, linear carbonates, lactone compounds, chained carboxylic acid esters, cyclic ethers and chain ethers, having 3 to 9 carbon atoms in total respectively, and the total amount of the solvent, and the compound is 70 to 100 weight % in said non-aqueous electrolyte exclusive of the lithium salt.

7. A non-aqueous electrolyte secondary battery as defined in claim 6, wherein at least one of the cyclic carbonate and the lactone compound are present, and the total amount of the cyclic carbonate and the lactone compound is 5 weight % or more of said non-aqueous electrolyte exclusive of the lithium salt.

8. A non-aqueous electrolyte secondary battery as defined in claim 6, wherein
the at least one solvent is selected from the group consisting of cyclic carbonates, linear carbonates, lactone compounds, and
the lactone compound is at least one selected from the group consisting of γ-butyrolactone, γ-valerolactone and δ-valerolactone,
the cyclic carbonate is at least one selected from the group consisting of ethylene carbonate, propylene carbonate and butylene carbonate, and
the linear carbonate is at least one selected from the group consisting of dimethyl carbonate, diethyl carbonate and ethyl methyl carbonate.

9. A non-aqueous electrolyte secondary battery as defined in claim 1, wherein the lithium salt contains 5 to 100 mol % in the total amount of lithium salt of at least one selected from the group consisting of $LiBF_4$ and $LiPF_6$.

\* \* \* \* \*